United States Patent [19]

Spencer

[11] 4,410,946
[45] Oct. 18, 1983

[54] CACHE EXTENSION TO PROCESSOR LOCAL STORAGE

[75] Inventor: Dana R. Spencer, Wappingers Falls, N.Y.

[73] Assignee: International Business Machines Corporation, Armonk, N.Y.

[21] Appl. No.: 273,823

[22] Filed: Jun. 15, 1981

[51] Int. Cl.³ ............................................. G06F 13/00
[52] U.S. Cl. .................................................. 364/200
[58] Field of Search ................................ 364/200, 900

[56] References Cited

U.S. PATENT DOCUMENTS

| | | | |
|---|---|---|---|
| 3,657,705 | 4/1972 | Mekota et al. | 364/200 |
| 3,701,977 | 10/1972 | Mendelson et al. | 364/200 |
| 4,084,234 | 4/1978 | Calle et al. | 364/200 |
| 4,208,716 | 6/1980 | Porter et al. | 364/200 |
| 4,310,879 | 1/1982 | Pandeya | 364/200 |

OTHER PUBLICATIONS

Caspers et al., "Cache-Resident Processor Registers", IBM Technical Disclosure Bulletin, vol. 22, No. 6, Nov. 1979.

*Primary Examiner*—Mark E. Nusbaum
*Assistant Examiner*—Michael R. Fleming
*Attorney, Agent, or Firm*—Bernard M. Goldman

[57] ABSTRACT

The disclosure pertains to a relatively small local storage (LS) in a processor's IE which can be effectively expanded by utilizing a portion of a processor's store-in-cache. The cache allocates a line (i.e. block) for LS use by the instruction unit sending a special signal with an address for a line in a special in main storage which is non-program addressable (i.e. not addressable by any of the architected instructions of the processor). The special signal suppresses the normal line fetch operation of the cache from main storage caused when the cache does not have a requested line. After the initial allocation of the line space in the cache to LS use, the normal cache operation is again enabled, and the LS line can be castout to the special area in main storage and be retrieved therefrom to the cache for LS use.

5 Claims, 16 Drawing Figures

FIG.2A STORE INTO SCRATCH SPACE (STSS) CMD TO BCE

| PSW STORAGE KEY | LOGICAL ADDRESS | STSS OP CODE |
|---|---|---|
| (4 BITS) | (32 BITS) | (8 BITS) |

FIG.2B FETCH EXCLUSIVE WITH SUPPRESSED DATA TRANSFER (FESDT) CMD TO SC

| PSW STORAGE KEY | ABSOLUTE ADDRESS | #DW | FESDT OP CODE | CPU ID |
|---|---|---|---|---|
| (4 BITS) | (27 BITS) | (4 BITS) | (8 BITS) | (2 BITS) |

FIG.2C  SC INV/CO CMD TO BCE

| DIRECTORY CLASS ADDRESS | DIRECTORY SET ADDRESS | CASTOUT BIT | INVALIDATE BIT |
|---|---|---|---|
| (8 BITS) | (4 BITS) | (1 BIT) | (1 BIT) |

FIG.2D  BCE INVALIDATE SC DIRECTORY ENTRY CMD

| DIRECTORY CLASS ADDRESS | DIRECTORY SET ADDRESS | NON MS REQ | OP CODE FOR INVALIDATING SC DIR ENTRY | CP ID |
|---|---|---|---|---|
| (8 BITS) | (4 BITS) | (1 BIT) | (8 BITS) | (2 BITS) |

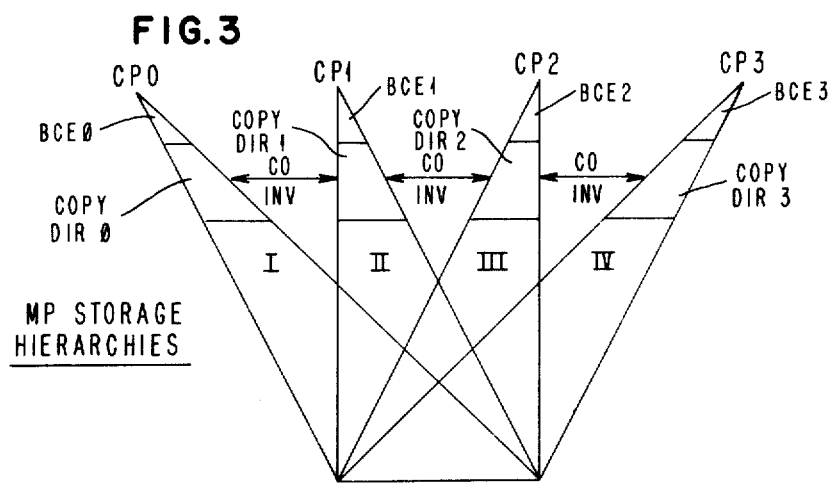

FIG.3
MP STORAGE HIERARCHIES (IEO IN CPO)

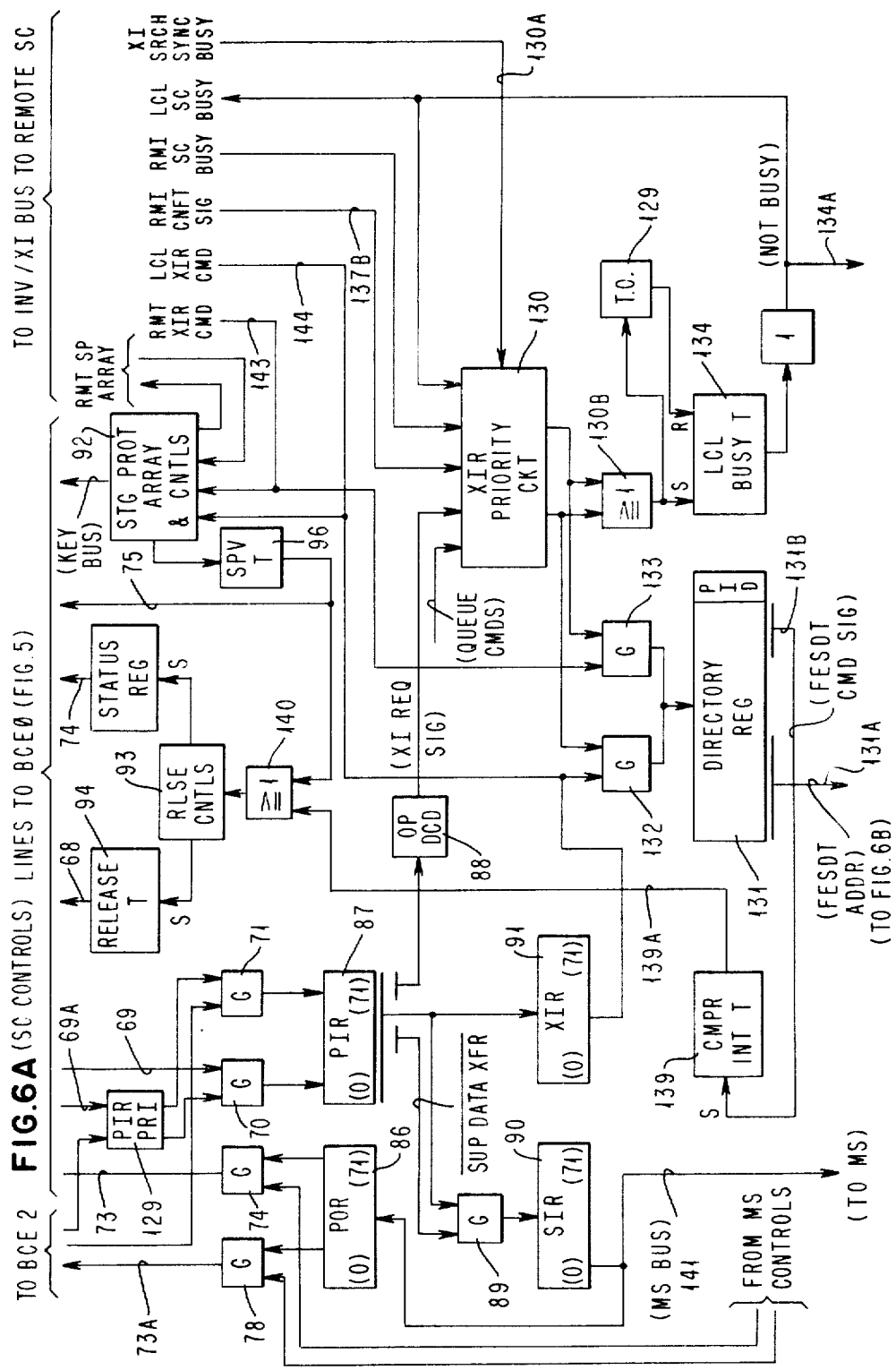
FIG. 6A (SC CONTROLS)

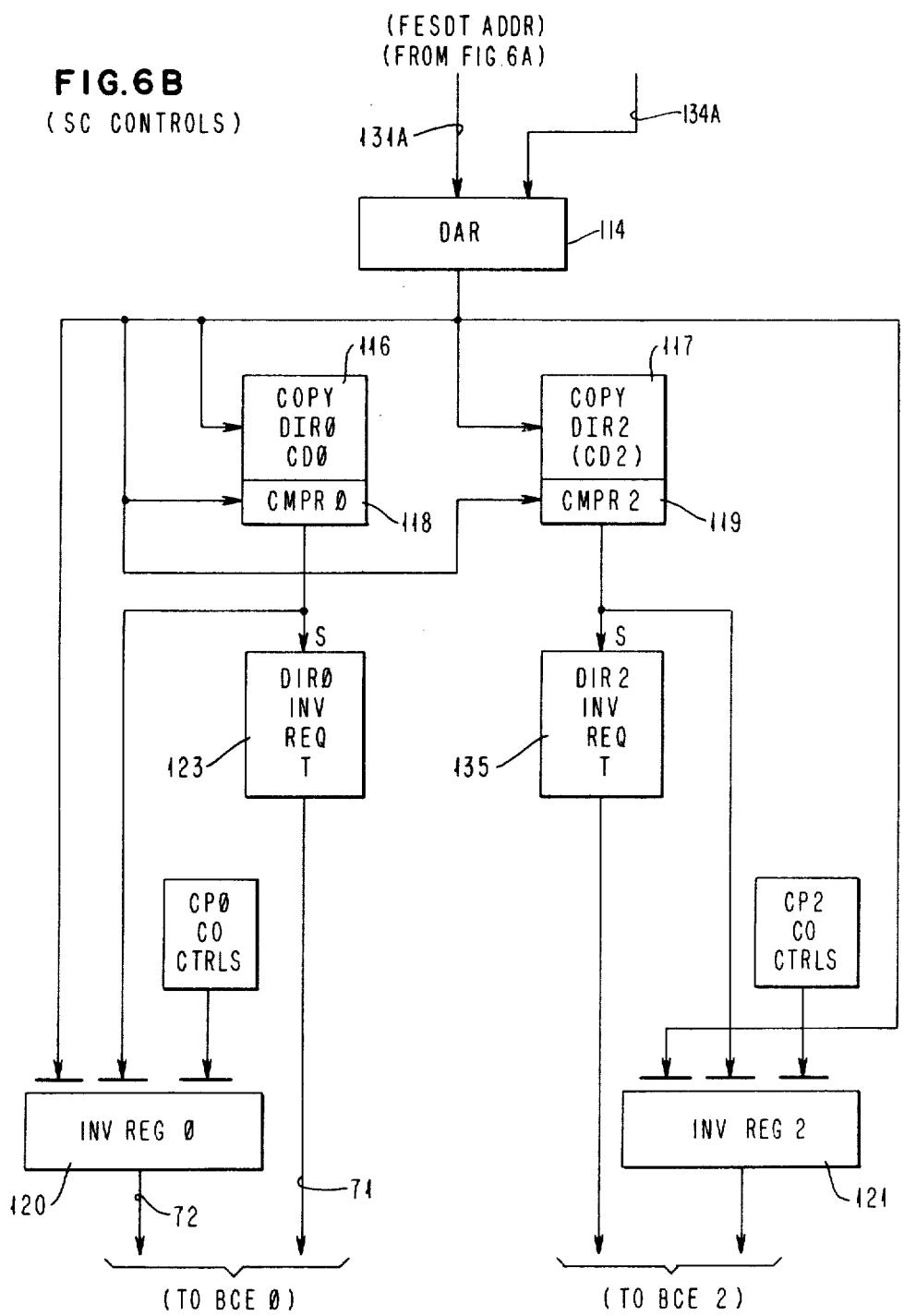

CACHE EXTENSION TO PROCESSOR LOCAL STORAGE

INTRODUCTION

The subject invention relates to improvements in cache controls to enable a store-in cache to be used as an extension of the local storage of a data processor.

PRIOR ART

For decades, central processors have provided local storage (LS) in their instruction units (IE) for the temporary storage of intermediate results occurring during the execution of an instruction, while execution may be controlled solely by hardware or by microcode, depending on the design of the IE. Instruction parameters and results are also stored in LS to enable a retry of an instruction upon the sensing of an error condition during its execution. The local storage is often designed as non-program addressable registers or as a small array in which a part may contain the program-addressable general registers in the IE. Close proximity to IE hardware utilizing the LS facilitates fast access of required data. All current commercial central processors in public use are believed to have a local storage in their IE.

An example of a processor embodiment having local storage is disclosed in U.S.A. patent application Ser. No. 194,639; filed on Oct. 6, 1980, entitled "Store-In-Cache Processor Means For Clearing Main Storage" by C. W. Evans et al which application is incorporated herein by this reference thereto.

SUMMARY OF THE INVENTION

The amount of local storage (LS) available in the IE may be sufficient for the complete execution of most of the instructions in the architecture by means of hardware or microcode, other than for operands required from main storage (MS) which may be temporarily held in a processor cache.

As processor architecture becomes more complex, a few of the processor instructions and/or microcode routines may generate data in relatively large quantities which may require a relatively large LS in the IE.

It is therefore the principle object of this invention to enable an IE to contain a relatively small LS but to enable the LS to be effectively expanded by utilizing a portion of a processor's store-in-cache as a backing storage for LS data. As a consequence, the IE can be designed to have a relatively small LS which will accommodate the frequently used instructions and microcode operations and yet have the assurance that any instruction or microcode functions requiring a large LS can be accommodated by then extending LS to include part of the processor cache. It is noted that this invention may not be applicable to a processor using the conventional store-thru cache, since such store-thru cache does not receive a processor store operation unless the referenced line already exists in the cache. However, a store-thru cache can be modified to include this invention by being made to have a store-in operation for LS data.

It is another object of this invention to enable greater flexibility in the future use of a microcoded processor, so that its local storage will have a sufficient effective size to handle almost any future microcoded function, such as might be caused by some future architectural change to the processor.

It is a further object of this invention to avoid the slow technique of storing extra local storage data directly into main storage.

It is still another object of this invention to use a non-program addressable area in main storage as backing storage for a temporary LS portion of a processor store-in-cache which may be used, at the moment, for LS data quantities beyond the LS storage capability in the IE.

It is a still further object of this invention to utilize a store-in-cache for LS overflow without the cache performing any line fetch of data from main storage.

These objects are obtained by providing a special control for a store-in-cache which causes the cache to allocate a line (i.e. block) to LS by sending an address for a line in a special area (SA) in main storage which is made non-program addressable (i.e. not addressable by any of the architected instructions of the processor), and by enabling the IE to suppress the normal line fetch operation of the cache (from main storage) caused by a miss in the cache directory compare circuits. After the initial allocation of the line space in the cache to LS data, the normal cache operation is again enabled for the LS line, which can be castout to the SA in main storage.

BRIEF DESCRIPTION OF THE DRAWINGS

FIGS. 2A, 2B, 2C and 2D illustrate the types of information found in various commands used in the described embodiment of the invention.

FIG. 3 illustrates diagramatically the overlapping storage hierarchies found in a multiprocessing (MP) system having processor exclusive caches and a shared main storage (MS).

FIGS. 6A and 6B illustrate the pertinent controls found in each system controller (SC) shown in FIG. 1.

DESCRIPTION OF THE PREFERRED EMBODIMENT

Figure 1:
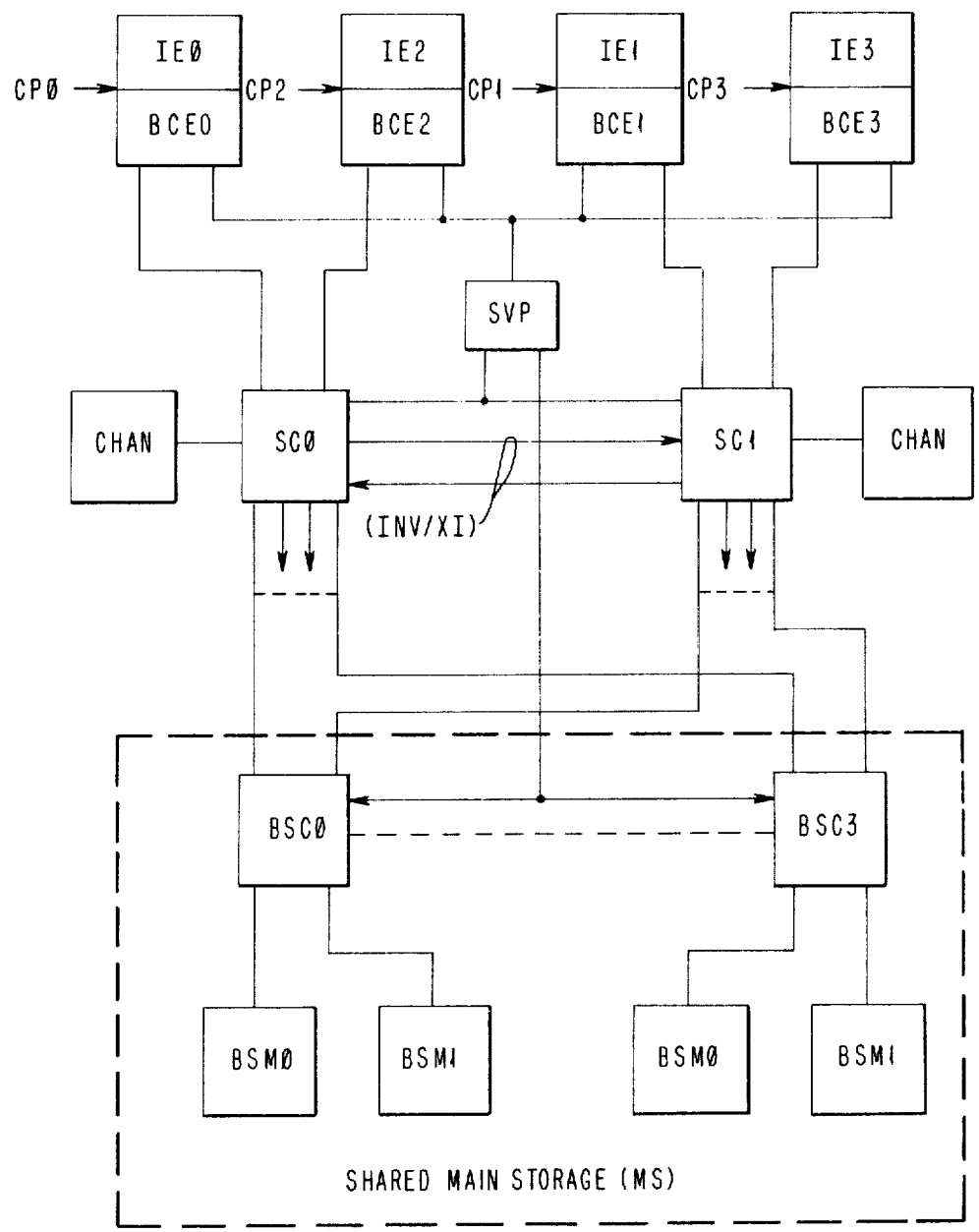
FIG. 1 is a block diagram of a multiprocessing system utilizing the subject invention.

The multiprocessor (MP) illustrated in FIG. 1 comprises four central processors CP0 through CP3, in which each CP includes an instruction execution (IE) unit and a buffer control unit (BCE). The BCE includes a processor store-in cache (SIC) with its associated processor cache directory and associated processor cache controls which are exclusively used by the associated CP. The conventional aspects of each BCE with its cache directory and cache in the subject embodiment are constructed and operate as disclosed and claimed in prior filed patent application entitled "Improved Cache Line Shareability Control For A Multiprocessor" having U.S.A. Ser. No. 205,500, filed Nov. 10, 1980 by F. O. Flusche et al and assigned to the same assignee as the subject application. The IE includes the hardware which issues fetch and store commands to the BCE.

One of the store commands that can be issued by the IE unit to its BCE is a store into scratch space (STSS) command. This command is illustrated in FIG. 2A. The STSS command allows the IE unit to store data into a line without requiring the prior transfer of that data line into its BCE by a line fetch from main storage. An IE data store request without the STSS command requires a prior line fetch into SIC before the IE store can occur in SIC.

Two system controllers SC0 and SC1 each connect to two CPs and to the shared main storage (MS), so that either connected processor can access any shared area in main storage. Each SC also connects I/O to the shared main storage. Each SC may include the subject matter disclosed in U.S.A. Pat. No. 4,280,176; filed: Dec. 26, 1978 by K. G. Tan entitled "Memory Configuration, Address Interleaving, Relocation and Access Control System" and U.S.A. Pat. No. 4,293,910 filed: July 2, 1979 by F. O. Flusche et al entitled "Reconfigurable Key-In-Storage Means For Protecting Interleaved Main Storage.

The shared main storage comprises of a plurality of BSM controllers BSC0 through BSC3 in which each BSC connects to two BSMs 0 and 1. The four BSCs 0-3 are each connected to each SC.

An invalidate cross-interrogate (INV/XI) bus connects from each SC to the other SC. The INV/XI bus communicates all cross-interrogation (XI) requests and all castout (CO) and invalidate (INV) signals between the SCs in order to coordinate the required castouts and invalidations in the directories.

Each SC contains a pair of copy directories. Each copy directory contains an image of the contents of a corresponding processor cache directory in one of the BCE's connected to the respective SC.

FIG. 3 illustrates the storage hierarchies I through IV found between the respective CPs and the shared main storage. Thus, each CP interfaces the apex of a hierarchy comprising the BCE cache found with the respective CP. Each BCE interfaced its corresponding copy directory. The base of the hierarchy is the shared MS with which each CP communicates. The data transfer between each CP and the shared MS is performed a line at a time, in which each request from the BCE to the shared main storage is for a line of data or instructions in MS when a CPU request is not available in the BCE cache or the BCE cache does not have the latest changed version of the requested data.

The copy directories handle all cross-interrogation (XI) requests so that the processor cache directories in the BCEs will not need to handle the XI interrogation requests and can thereby better service their respective CPs. CO/INV busses communicate both invalidate and castout requests from other CPs so that conflicts between the CPs may be avoided when accessing shared main storage.

Figure 4:
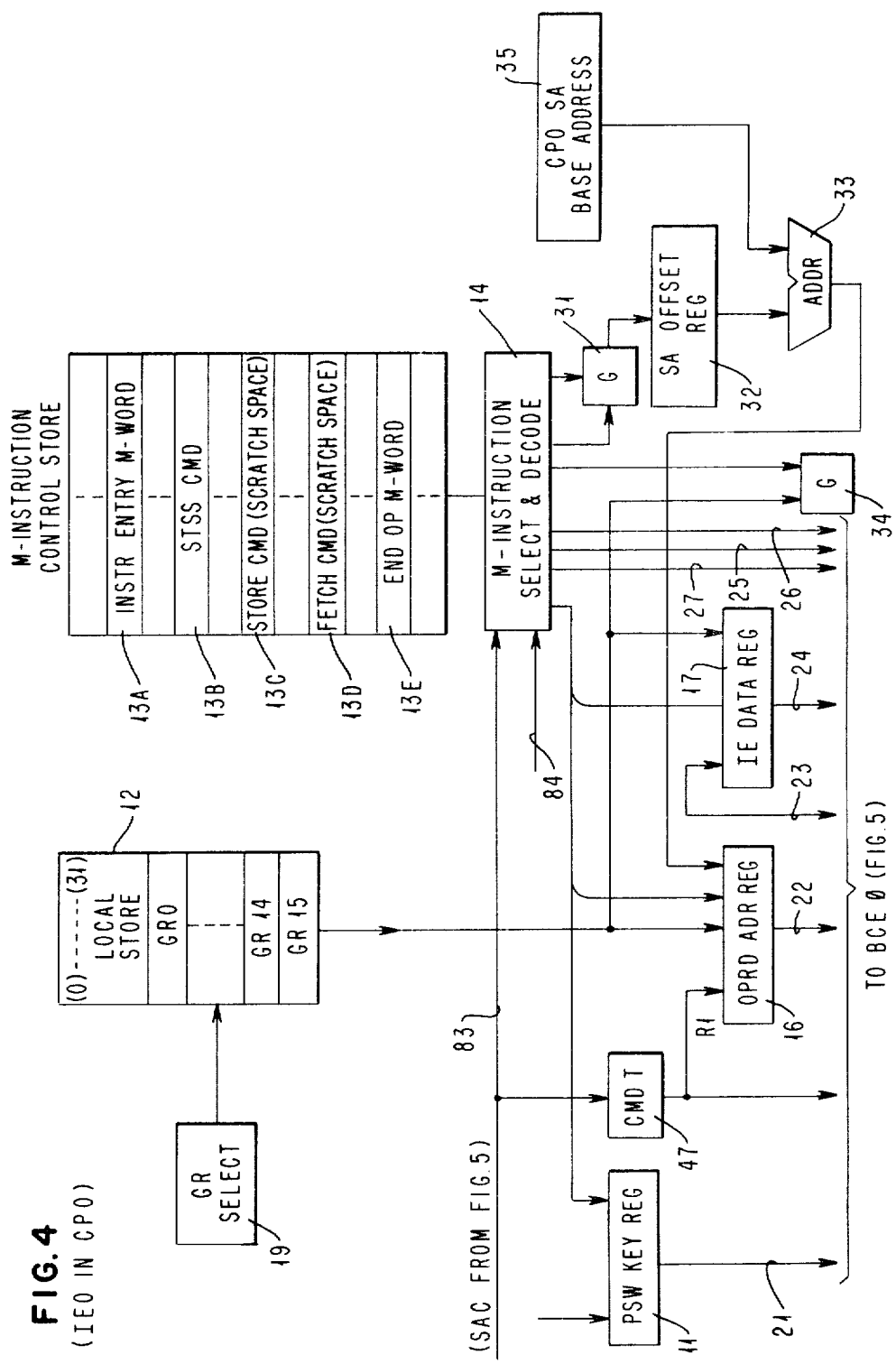
FIG. 4 illustrates controls found in the instruction execution (IE) of any one of the central processors (CPs) shown in FIG. 1 of which CP0 is used as the exemplary processor.

FIG. 4 illustrates the instruction execution (IE) unit in CP0 in regard to the issuance of a store into scratch space (STSS) command by CP0. Each of the other CPs 1–3 has an IE identical to the IE0. The described IE unit is basically similar to IE units in microprogrammed processors having a microinstruction control store containing microprograms. A unique microinstruction designated the STSS (store into scratch space) microinstruction, is provided in control store 13 for initiating the acquisition of scratch space by addressing the SA area in the shared main storage. The store into scratch space (STSS) microinstruction is issued via the microinstruction select and decode unit 14 for the first LS store request into the SA area for the respective IE for a program instruction being executed by the IE.

An example of the issuance of the STSS microinstruction is provided in a microinstruction routine shown in FIG. 4. Program instructions which may, for example, use the STSS microinstruction are complex instructions requiring much local store space, such as the S/370 start I/O (SIO), some MVS assist instructions, some VM assist instructions, move character long (MVCL), etc. During one of these complex program instructions, it is necessary to acquire scratch space in the SIC to supplement the IE local store for storing temporary results that are needed for the duration of the program instruction, but not required after the completion of the program instruction.

The program instruction execution begins by decoding a first microword 13A that initiates the execution of the function to be done by the instruction. At that time scratch space is required during the instruction execution, and microword 13B is executed to invoke the STSS command, which causes a line entry to be assigned in SIC directory 62, by the conventional cache LRU circuits. The STSS command stores LS data into SIC 63 without requiring that a line fetch be generated if the line STSS addressed line is not currently resident in the buffer.

Subsequent to the acquisition of the line of scratch space in directory 62, by an STSS command subsequent store and/or fetches can be made to the same scratch space line in SIC 63 using conventional IE store and fetch commands of the type disclosed in application Ser. No. 205,500. Thus only the acquisition of scratch space in directory 62 is handled as a special case by the STSS microinstruction. The conventional store and fetch commands will cause a line fetch from main storage in the conventional manner if they miss in the cache. Thus, if a LS line in the cache is castout, it is handled in the same manner as any other line castout of the cache and is stored in main storage at its line address represented in the cache directory. Thus, the castout of local store data from SIC 63 causes LS data overflow from the cache into main storage. Hence, main storage is available for cache overflowed local store data when the cache space is inadequate to contain it. The local store data may be fetched from the special area in main storage using the required line address in a normal fetch command (as disclosed in application Ser. No. 205,500) when it misses in the cache, operating in the conventional manner of SIC caches.

Since the corresponding line of data in SIC 63 may contain garbage, a store into a doubleword (DW) in the allocated line must first be done by the IE before the IC can fetch that DW from the allocated line.

Finally, the program instruction completes with a control store word that contains an end-op microinstruction 13E.

A block diagram of the circuits for generating the address of the allocated scratch space is illustrated in FIG. 4. A CP0 system area (SA) base address is held in register 35. The system area is a portion of main storage which is accessible by hardware (e.g. microcode) but is not accessible by a programmer executing program instructions. Each processor has a section of system area reserved for its communication purposes, and the content of register 35 points to the beginning of this reserved area. The microinstruction routine will have predetermined the offsets to DW locations in the CP SA area, and these DW addresses will be used by the STSS microinstructions issued by the routine, which provides the STSS command shown in FIG. 2A. This offset is put into register 32 and is added to the CP SA base address by adder 33, and the result is placed in operand address register 16. A PSW key register 11 enables the STSS command to determine that there is no protection violation when it accesses a line in MS.

Upon the completion or termination of each STSS, STORE, or FETCH command issued by the IE, a successful action completed (SAC) signal is received from its BCE. The SAC signal causes the IE to issue the next command. Also a command trigger 47 is set by the SAC signal to also control the ingating into register 16. Each time a STSS command is issued, its decoder unit 14 activates its command request line 25 to signal the BCE that another command is available for BCE execution.

Figure 5:
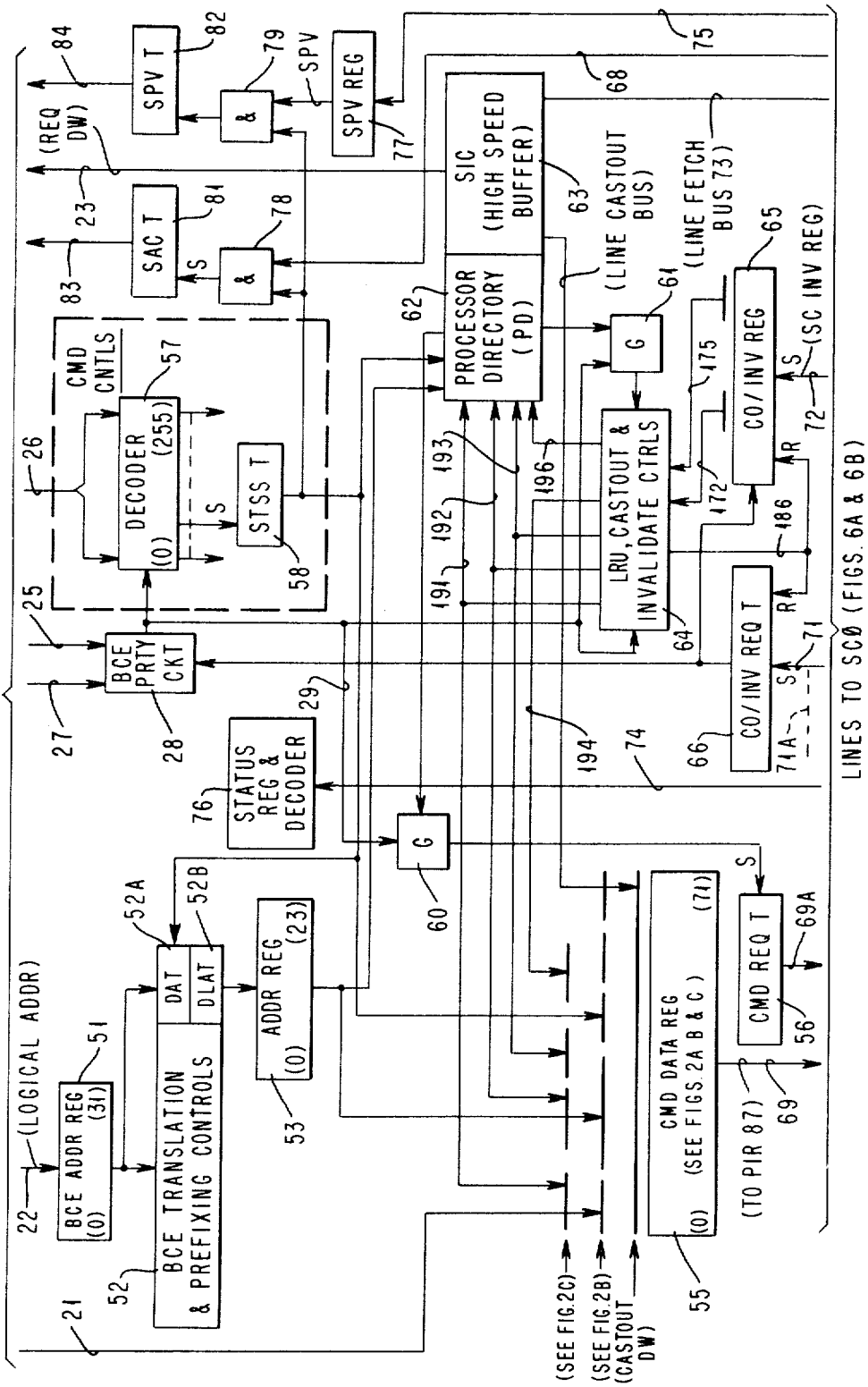
FIG. 5 illustrates the processor cache controls (BCE) found in each central processor.
Figure 7:
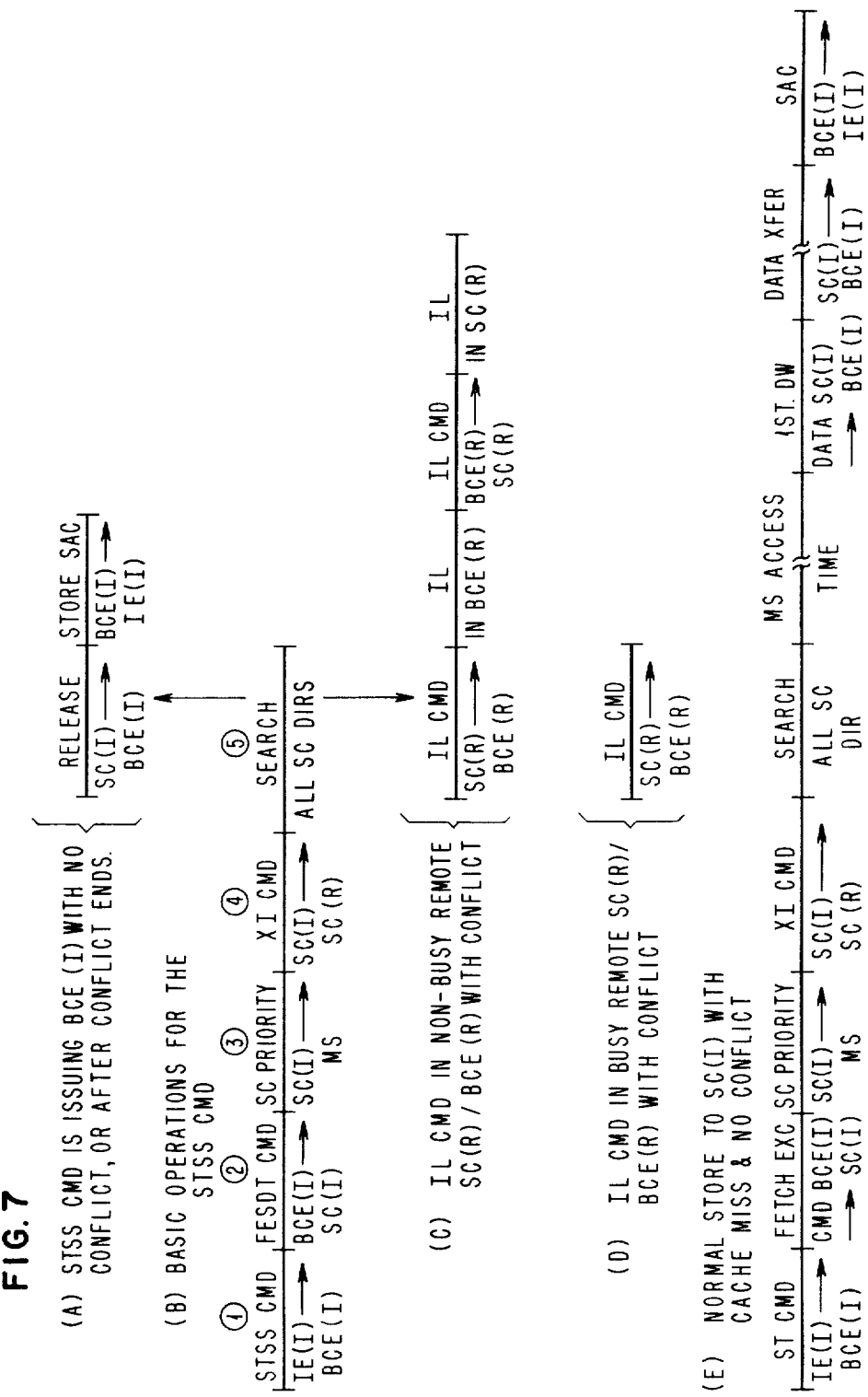
FIGS. 7A, 7B, 7C and 7D represent timing diagrams showing the sequencing of operations in the described embodiment.
FIG. 7E shows the sequencing of operations that would be required if this invention were not used.

The pertinent details in BCE0 are illustrated in FIG. 5 and are representative of the other BCEs 1-3 in the MP system. BCE0 contains a processor store-in cache (SIC) 63 which is the high speed storage buffer for CP0. All CP0 storage requests are provided to BCE0 which determines whether the requested data is currently in SIC 63.

The IE0 is capable of providing all processor commands. Most of the issued commands are storage access commands, but there are also special access commands which operate differently from commands that normally access storage, such as the STSS command.

The STSS command is one of up to 256 commands which may be decoded. When a command is decoded, a particular output from decoder 57 sets STSS trigger 58. Whenever the IE outputs a command, it activates a line 25 if it is a special command request (such as for a STSS command), or activates a line 27 if it is a normal storage request. Lines 25 and 27 are provided as request inputs to a BCE priority circuit 28 which determines which of contending requests will be accepted for execution by the BCE during the current machine cycle. Other request inputs (not shown) internal to the BCE are provided which are not pertinent to this invention.

Whenever any IE storage request misses in the cache, the output of priority circuit 28 is also provided on line 29 to set a command request trigger 56 to indicate a request to a PIR priority circuit 129 in FIG. 6A that a command will be available from register 55 in BCE0 during the next machine cycle. A similar command being formulated in the BCE2 of CP2 would set the CP2 identifier bit on in the command. Hence, the SC can use the CP ID field in the command to recognize which CP issued the command.

When the BCE receives a STSS command from the IE unit, the processor directory 62 is accessed to determine if the requested line is resident exclusive in SIC 63. If so, (command hit in the cache) the store is made into SIC 63 by LS data accompanying the STSS command. If not, (command miss in the cache) a request is generated by gate 60 to activate CMD request trigger 56. Gate 61 activates the conventional LRU, castout and invalidate controls 64 when (1) the STSS requested line is not in SIC 63, and (2) the line addressed by the STSS command is allocated to space occupied by a line that must be castout. Each STSS command is handled under these conditions when detected by STSS trigger 58, which causes the SA address in the STSS command to be entered into a DLAT 52B without address translation by DAT 52A, since the SA address is provided as an absolute address in main storage.

When the STSS command encounters a cache miss, a FESDT command is in a command data (CMD/DATA) register 55 in FIG. 5 to represent to the SC controls in FIG. 6 that a STSS command missed in the cache. The exemplary FESDT format is illustrated in FIG. 2B which component parts are gated into register 55 by the set of gates which reference FIG. 2B in FIG. 5, wherein the five gates respectively receive the five information components shown in FIG. 2B. Thus, the first information component, PSW key, is gated on lines 21. The absolute address of the line is outputted from a register 53 which receives the same SA address in the received IE command from the dynamic lookaside address translation (DLAT) array 52B. Controls 52 receive the logical address provided by the IE to BCE address register 51 on lines 22 provided from operand address register 16 in FIG. 4. The formulated FESDT command is gated out of register 55 on bus 69 to processor input register (PIR) 87 found in FIG. 6A.

A BCE0 command is provided from bus 69 through gate 70 to PIR 87 when permitted by a PIR priority circuit 129 which determines which command will be received by PIR 87 when BCE0 and BCE2 are simultaneously providing commands. Circuit 129 may provide alternating priority, or it may be a circuit such as described and claimed in U.S.A. Pat. No. 4,152,764. If no contention exists, a command is immediately accepted into PIR 87. Then the command is provided into the cross-interrogate register (XIR) 91 from which it is used to search all copy directories in the MP system. For searching the local copy directories, it is transferred into a directory register 131. For searching remote copy directories, XIR 91 is simultaneously transferred on line 144 to the XI bus from which it is received by the remote SC and put into its directory register 131, when it gets priority from the XIR priority circuits 130 in all SCs.

Therefore, PIR 87 also has an input from BCE2 provided to gate 71, in order to receive commands from CP2 under the control of priority circuit 129.

Whenever a command received into PIR 87 has a one bit in a suppress data transfer bit position of a command, (e.g. a bit position in the FESDT OP code field) it will deactivate a gate 89 to pass the command from PIR 87 to a storage input register (SIR) 90, from which the address and control bits are put on a main storage bus 141 as a request to main storage.

Before any command can pass from either the local or remote XIR 91, it must obtain priority from an XIR priority circuit 130 in every SC. Circuit 130 determines the priority of contention for searches in all SC copy directories, of which the local copy directories are shown in FIG. 6B as directories 116 and 117. Similar copy directories exist in each remote SC. The requesting inputs to circuits 130 are the inverted output from a local busy trigger 134, the local cross-interrogate (XI) signal from an operation decoder 88 when it determines the command operation code in PIR 87 requires a directory search conflict determination, and a remote SC busy signal, a remote XIR request signal from the INV/XI bus. Also the XIR priority circuit 130 in each SC synchronizes its searches with the XIR priority circuit in each other SC via signals between them on a XI search synchronization bus 130A.

The output of priority circuit 130 determines whether a local command in XIR 91 or a remote command from the remote XIR register is prmitted to input into directory register 31 via gate 132 or 133, respectively. The priorities in circuit 130 and signals on bus 130A are such as to cause the same request to be searched simultaneously in all local and remote SC copy directories. The synchronization is aided by the priority selection in circuit 130 in which the local and remote SC busy lines inhibit a search for a respective command if the SC is busy during that machine cycle.

| PRIORITIES OF SEARCHES IN LOCAL SC | | | | |
|---|---|---|---|---|
| Local Cmd | Local Busy | Remote Cmd | Remote Busy | Simultaneous Search In Local Directories |
| No | No | Yes | No | Search Remote Cmd |
| Yes | No | No | No | Search Local Cmd |
| Yes | No | Yes | No | Search SC0 then SC1 Cmds Alternately |
| No | X | No | X | Wait |
| X | Yes | X | X | Wait |
| X | X | X | Yes | Wait |
| X | No | X | No | Wait |

X = Don't care if yes or no

If any command is selected, one of the two output lines from circuit 130 activates either gate 132 or 133 to select the local or remote XIR command address for searching in all copy directories. The two output lines are received by an OR circuit 130B, which provides an output that sets the local busy trigger 134 to indicate all copy directories in the system are busy. A timeout circuit 129 also is activated by the set signal; and after a time period equal to the search time for all directories, it outputs a reset signal to trigger 134, putting it in its non-busy state. The non-busy signal from trigger 134 on line 134A gates the transfer of bus 131A into DAR in FIG. 6B.

The execution of a storage command also includes the key checking needed to assure that there is no main storage protection violation (SPV) by a FESDT command. This is done by providing a command on line 144 to a local SC storage protection array and controls 92 to select the local SC protect key for the storage block being accessed and compare it to the PSW key in the current command. Likewise, a command on line 143 is provided to controls 92 to protection check a remote request. The storage protect controls 92 may be constructed as described in prior filed U.S.A. application Ser. No. 054,350 (previously cited) in order to determine if a storage protect violation (SPV) exists, and then providing a signal which sets a SPV trigger 96 that provides a SPV signal on line 75 to BCE0. A storage protect violation actuates release controls 93 to end the execution for the command causing the violation by setting a release trigger 94 and a status register 95.

When a FESDT command is accepted by priority circuit 130, it is transferred into directory register 131, from which it outputs the FESDT address on lines 131A. The FESDT address is received by directory address register 114 which simultaneously searches both copy directories 116 and 117. Address decoder 114 decodes the class address in both directories and transmits the set selection bits to comparators 118 and 119 at the outputs of the directories to determine whether the requested address is in each directory in the manner conventional for set associative directories. If the FESDT address on line 131A is found in either directory, its comparator output sets an invalidation request trigger 123 for CP0, or invalidation request trigger 135 for CP2.

The request for a directory search of the copy directories caused by the FESDT command from directory register 131 sets a comparison initiated trigger 139 which provides an input to OR circuit 140 which sends a release signal 68 to the requesting BCE.

When invalidation request trigger 123 is set, an invalidation command is formulated in a register 120 for CP0. Likewise, if SC copy directory 2 sets invalidation request trigger 135, an invalidation register 121 formulates an invalidation command for CP2. The information in the invalidation command is illustrated in FIG. 2C and it is transmitted from the SC to the respective BCE having a conflict in its SIC directory (castout fields in this SC to BCE command are not pertinent to this invention and are not described in detail). The content of register 120 therefore includes the directory class address obtained from the output of DAR 114, while that set address is obtained from the output of comparator 118, and the castout bit is obtained from the respective CPs C0 controls. The invalidate bit is not in register 120 but is provided on line 71 from the output of invalidation request trigger 123.

Invalidation register 121 has its command formulated in the same manner as in register 120, except that register 121 formulates its command only from CP2 information.

The invalidation command is sent from the SC to the respective BCE register 65 and trigger 66 in FIG. 5. When set, the invalidation request trigger 66 activates the output from register 65 to the cache castout and invalidate controls 64, in order to specify a search of the BCE0 SIC directory 62 for the address having the class and set indicated in register 65.

The output of invalidation request trigger 66 simultaneously provides a signal to BSE priority circuit 28 to request the search of the SIC directory, since it is possible for simultaneous search requests to exist from other sources. When priority is signalled on line 29, controls 64 cause the search to immediately occur. When the search finds the required entry in the SIC directory, the signal from trigger 66 causes the valid bit in the found entry to be set to its invalid state to invalidate the corresponding line in SIC 63.

The operations of castout and invalidation used in this invention are the same as provided in the prior art and are not described in detail.

The release controls 93 are actuated by a signal from an OR circuit 140 in FIG. 6A which receives a line 139A from comparison initiated trigger 139.

FIGS. 7A through 7E illustrate the sequence of operations that occur with the hardware illustrated in FIGS. 4, 5, 6A and 6B. In FIGS. 7, IE(I) represents the IE unit with the CPU issuing the STSS command. BCE(I) represents the BCE with the CPU issuing the STSS command. BCE(R) represents a remote BCE which finds a conflict in its cache directory, but BCE(R) did not issue the FESDT command having the conflict. In FIGS. 7A through 7E the numerals in circles represent the time sequence of operations, in which the operation is indicated by the word(s) above a horizontal line and between adjacent vertical lines, and the statement below the horizontal line represents the transfer or location of the indicated operation.

FIG. 7B represents the basic sequence of operations which occur from the initial issuance of the STSS command until the synchronized searches find no conflict in all SC copy directories in the MP. FIG. 7C represents the sequence of operations in the issuing IE, BCE and SC if an MP cache conflict is indicated.

FIG. 7A represents the final sequence of operations whenever the simultaneous search in all copy directories during time 5 in FIG. 9B finds that no MP conflict exists, in which case accept trigger 104 is set which then causes BCE(I) to store into the address specified in the STSS command in the line allocated to this address in its cache and raise the SAC line 83 to IE(I).

Most STSS command requests are likely not to find any conflict, in which case only the sequences in FIGS. 7B and 7A occur. Whenever a conflict is found in any copy directory, the sequence in FIG. 7C occurs, and the sequence in FIG. 7D occurs if any remote SC is busy, which causes the resend command to issue in SC(I).

FIG. 7E shows the timing that would be experienced in the absence of this invention. A main store access is requested in cycle 3 and, assuming no conflict, a main store access followed by transfer of the requested data from the SC to the requesting BCE results. The resulting time as seen by the requesting IE unit is considerably longer than the time seen in case 7A, which is the no conflict case using this invention.

The other aspects of the sequence diagrams in FIGS. 7A through 7E are considered self-explanatory in view of the prior explanation of the embodiment.

Although this invention has been shown and described with respect to plural embodiments thereof, it should be understood by those skilled in the art that various changes and omissions in the form and details of the invention may be made therein without departing from the spirit and the scope of the invention.

Having thus described my invention, what I claim as new, and desire to secure by Letters Patent is:

1. A processor including an instruction (IE) unit for executing any of a programmable set of instructions, a main storage (MS), a high-speed cache connected between the IE and the MS, and cache controls, the invention comprising:

local store (LS) command means connected from the IE to the cache controls to signal a LS store operation in the cache for IE local storage (LS) information, cache addressing means for addressing a class of one or more entries normally used for storing operand data in a cache directory within the cache controls, means for assigning one entry in the addressed class to a IE request for a LS store operation, fetch inhibit means enabled by a LS command from the LS command means for preventing a line fetch request to MS by the cache controls when a cache miss occurs due to a LS command, whereby LS data may be stored in and fetched from any entry in the cache by the IE after the cache controls are enabled by a LS command, a processor designated area being provided in MS hardware, the processor designated area having locations addressable in a LS command but not being addressable by any MS address field in commands for programmable instructions, a LS command from the LS command means for requesting a LS access to a location in the processor designated area, detecting means in the cache controls for detecting a LS command containing an address to a processor designated MS area, the cache addressing means in the cache control receiving an address provided with any IE storage command, including the address to the processor designated MS area provided with a LS command, in order to address a class of entries in a cache directory in the cache controls, means for actuation the fetch inhibit means in the cache controls in response to the detection means detecting a LS command to prevent any line fetch to MS from occurring in response to the LS command, and means for transferring LS data from the IE to the cache controls for being stored in the cache location provided by the assigning means.

2. A processor as defined in claim 1, in which:

the processor is one of plural processors in a multiprocessor, the cache is a store-in type of cache having a cache directory containing MS line entry positions, in which each position has at least a valid field, an exclusive field, and an address tag field, means in the cache controls actuated by the LS command for setting an exclusive flag field to exclusive state in the cache directory entry provided by the assigning means.

3. A process as defined in claim 2, further comprising:

the detecting means in the cache controls also detecting any fetch exclusive command provided by the IE with an address to a location in the processor designated area in MS, cache hit/miss determining means in the cache controls signalling if the cache directory has a valid entry representing the MS address in the fetch exclusive command to thereby provide a hit indicating signal to the IE, means for transferring to the IE the requested data from any valid cache location corresponding to the cache directory entry located by cache hit/miss determining means in response to the hit indicating signal, whereby LS data is transferred from the cache location to the IE.

4. A processor as defined in claim 3, further comprising:

the assigning means being actuated by an LS command received from the IE for assigning a valid entry in the cache directory to the LS command when a cache miss in the cache directory is determined by the cache hit/miss determining means, the assignment means including cache line entry replacement means for assigning a cache line entry in an addressed class of entries, cache castout means for casting out to main storage any valid data in the cache line addressed by the assigned cache entry before the cache can be stored with LS data provided by the IE with the LS command, whereby the valid data castout by the cache castout means can be LS data which is stored into the MS address in a non-program-addressable processor designated area in MS, wherein MS is a further storage hierarchy level for LS data.

5. A processor as defined in claim 4, further comprising:

the detecting means detecting a fetch exclusive command provided by the IE with a MS address to the processor area, the cache hit/miss determining means providing a cache miss signal, and the assignment means assigning a cache directory entry in response to the cache miss signal, cache line fetch means actuated by the miss signal to cause LS data to be moved from the line in MS at the address in the fetch exclusive command, a valid field in the assigned cache directory entry being set on for the LS line moved into the cache, whereby LS data stored in MS can be retrieved by the IE by a fetch exclusive command.

* * * * *